United States Patent Office 3,508,870
Patented Apr. 28, 1970

3,508,870
OSMIUM CARBONYL
Christopher William Bradford, London, England, assignor to Johnson, Matthey & Co. Limited, London, England, a British company
No Drawing. Filed Jan. 2, 1968, Ser. No. 694,887
Claims priority, application Great Britain, Jan. 3, 1967, 221/67
Int. Cl. C01g 1/04, 55/00
U.S. Cl. 23—203                                5 Claims

ABSTRACT OF THE DISCLOSURE

Method of preparing osmium carbonyls wherein a solution of osmium tetroxide in an inert hydrocarbon solvent is heated at an elevated temperature under super atmospheric pressure in the presence of carbon monoxide. The product is primarily $Os_3(CO)_{12}$ with traces of $Os_4O_4(CO)_{12}$.

---

This invention relates to a method of making osmium carbonyls. Osmium carbonyl is believed to be potentially useful in the manufacture of catalyst materials.

Osmium carbonyls may be manufactured by the Hieber Method using, as a starting material, osmium-tetroxide—a volatile crystalline solid. In the Hieber method osmium tetroxide is heated in an autoclave at 150° C. for about twelve hours in an atmosphere of carbon monoxide at 150 atmospheres pressure. The autoclave is allowed to cool and the pressure is released slowly until atmospheric pressure is reached. The final product which contains a mixture of two carbonyls of osmium and various decomposition products, is then removed. The two carbonyls contained in the final product are:

(a) Dodeca carbonyl tri-osmium—$Os_3(CO)_{12}$—a yellow crystalline solid.
(b) Osmium oxycarbonyl—$Os_4O_4(CO)_{12}$—a white microcrystalline solid.

The two carbonyls may be separated by fractional crystallisation from a solution of the mixture in benzene.

The main disadvantage of the Hieber method is that only 10–20% of the osmium tetroxide is converted to carbonyl, which collects on the lid of the vessel. The remainder of the oxide, probably owing to its volatile nature and the existence of hot-spots in the autoclave, appears to decompose and forms a black substance which contaminates the product. Large batches have a tendency to give relatively lower yields, corresponding to less than a 20% conversion.

It is an object of the invention to provide a method for manufacturing osmium carbonyls from osmium tetroxide, which method will give a more efficient conversion of osmium tetroxide than known methods, and with fewer impurities in the resulting product.

Accordingly, the present invention provides a method of making osmium carbonyls, in which a solution of osmium tetroxide in a hydrocarbon solvent inert to osmium tetroxide is heated under super-atmospheric pressure in the presence of carbon monoxide.

We have found that the reaction gives substantially 100% conversion of the oxide to give a product consisting mainly of $Os_3(CO)_{12}$ with traces of $Os_4O_4(CO)_{12}$, substantially free from decomposition products. The dodecacarbonyl tri-osmium can be separated by fractional crystallisation from a solution of the mixture in benzene.

The reaction may be carried out at an initial pressure (when cold) of 10 to 300 atmospheres and preferably 150 atmospheres. With regard to the temperature at which the reaction is carried out, at an initial pressure of 150 atmospheres a very suitable temperature is 175° C.

Two methods of manufacturing osmium carbonyl in accordance with the invention will now be described by way of example:

EXAMPLE 1

(a) One gram of osmium tetroxide was dissolved in 20 ml. of xylene at room temperature in a glass container or liner and placed inside a stainless steel 100 ml. autoclave having ½ inch thick walls, which was closed and tightly bolted.

(b) the autoclave was evacuated to remove the air present and refilled with carbon monoxide at an initial pressure of 130 atmospheres.

(c) the autoclave was heated to 175° C. by an electric element surrounding the autoclave for a period of 12 hours.

(d) The autoclave was allowed to cool to room temperature before the pressure was released.

(e) The pressure was released very slowly by opening a cock and equilibrium pressure was attained after some 2 minutes.

(f) the autoclave was then opened and the product, consisting of a mixture of about 1.2 gm. of yellow dodeca carbonyl tri-osmium and traces of the white osmium oxycarbonyl, was removed.

(g) the mixture was dissolved in benzene and the carbonyls were separated by fractional crystallisation.

Although in carrying out the invention, commercially available xylene comprising mainly ortho and para isomers with a little meta isomer was used, a pure xylene isomer or other mixtures of isomers may be used.

During our investigations, we have also found that variation in the pressure and temperature during the reaction produces more or less of the white oxycarbonyl and that higher pressures and higher temperatures reduce the amount of this oxycarbonyl present in the final product. The method of the invention allows larger batches of starting material to be handled than was the case with prior art methods and without loss of efficiency.

By the methods of invention it is possible to manufacture osmium carbonyl and oxycarbonyl efficiently and substantially free from contamination.

EXAMPLE 2

10.8 g. $OsO_4$ were dissolved in 200 ml. xylene in a glass container which was placed inside a 1 litre stainless steel autoclave. The autoclave was then evacuated and refilled with CO to 128 atm. The autoclave was heated to 150° C. and left overnight (16 hours). During heating overnight the temperature dropped to 110° C. and thereafter the rate of heating was increased and the temperature held at 175° C. for a further five hours. The autoclave was allowed to cool and then opened. The yield of $Os_3(CO)_{12}$ was about 9 g. (70%) with a further 1.5 g. of what was probably $Os_4O_4(CO)_{12}$. There was very little sign of decomposition so the remainder of the osmium must have been either in solution ($Os_3(CO)_{12}$ is slightly soluble in xylene) or lost as a gaseous carbonyl on opening the autoclave.

I claim:
1. A method of converting osmium tetroxide to osmium carbonyls, comprising dissolving the osmium tetroxide in a hydrocarbon solvent inert thereto, heating said solution under pressure and in the presence of carbon monoxide until a substantial proportion of the osmium tetroxide has been converted to one or more osmium carbonyls, and separating the osmium carbonyl product from the reaction mixture.

2. A method according to claim 1, in which the pressure is in the range 10–300 atmospheres.

3. A method according to claim 2, in which the temperature to which the osmium tetroxide solution is heated in the range 110–175° C.

4. A method according to claim 1, in which the hydrocarbon is xylene.

5. A method of making dodecacarbonyl tri-osmium from osmium tetroxide, comprising charging an autoclave with a solution of the osmium tetroxide in xylene, evacuating the autoclave of air, charging carbon monoxide to the autoclave at a pressure in the range 100–150 atmospheres, closing the autoclave, heating the contents of the autoclave to an elevated temperature for a period of time sufficient for a substantial proportion of the osmium tetroxide to be converted to dodecacarbonyl tri-osmium and separating the dodecacarbonyl tri-osmium from the reaction mixture.

References Cited

UNITED STATES PATENTS 3,387,932   6/1968   Pisa et al. _____ 23—203

OTHER REFERENCES

Bradford et al., "An Improved Method for the Preparation of $Os_3(CO)_{12}$, and Some Derivatives Thereof," Chemical Society of London, Chemical Communication, No. 8, April 1967, pp. 384–385.

Bradford, "Carbonyl Complexes of Osmium," Platinum Metals Review, vol. 11, No. 3, July 1967, pages 104 and 105.

OSCAR R. VERTIZ, Primary Examiner

EARL C. THOMAS, Assistant Examiner